(12) United States Patent
Ran et al.

(10) Patent No.: US 8,826,260 B2
(45) Date of Patent: Sep. 2, 2014

(54) CUSTOMIZATION OF MOBILE-APPLICATION DELIVERY

(75) Inventors: Alexander S. Ran, Palo Alto, CA (US); Daniel C. McGloin, Coronado, CA (US); Desiree D. G. Gosby, San Francisco, CA (US); Troy D. Otillio, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 415 days.

(21) Appl. No.: 13/004,613

(22) Filed: Jan. 11, 2011

(65) Prior Publication Data

US 2012/0180036 A1    Jul. 12, 2012

(51) Int. Cl.
*G06F 9/45*     (2006.01)
*G06F 9/445*    (2006.01)

(52) U.S. Cl.
CPC .................................... *G06F 8/60* (2013.01)
USPC ............................. 717/168; 717/172; 717/174

(58) Field of Classification Search
None
See application file for complete search history.

(56) References Cited

U.S. PATENT DOCUMENTS

| | | | |
|---|---|---|---|
| 6,606,744 B1 * | 8/2003 | Mikurak | 717/174 |
| 6,701,521 B1 | 3/2004 | McLlroy et al. | |
| 6,842,755 B2 * | 1/2005 | Maslov | 717/115 |
| 6,944,776 B1 * | 9/2005 | Lockhart et al. | 713/176 |
| 7,089,582 B1 * | 8/2006 | Dutta | 726/3 |
| 7,290,244 B2 * | 10/2007 | Peck et al. | 717/168 |
| 7,574,693 B1 * | 8/2009 | Kemink | 717/168 |
| 7,594,224 B2 * | 9/2009 | Patrick et al. | 717/172 |
| 7,603,440 B1 * | 10/2009 | Grabowski et al. | 717/168 |
| 7,610,583 B2 * | 10/2009 | Milius | 717/177 |
| 7,644,432 B2 * | 1/2010 | Patrick et al. | 717/172 |
| 7,809,740 B2 * | 10/2010 | Chung et al. | 707/758 |
| 7,844,963 B2 * | 11/2010 | Pitzel et al. | 717/172 |
| 7,849,458 B2 * | 12/2010 | Kurzweil et al. | 717/172 |
| 8,074,202 B2 * | 12/2011 | Da Palma et al. | 717/110 |
| 8,103,863 B2 * | 1/2012 | Brown et al. | 713/2 |
| 8,180,769 B2 * | 5/2012 | Liu et al. | 707/732 |
| 8,225,376 B2 * | 7/2012 | Zuckerberg et al. | 726/4 |
| 8,261,258 B1 * | 9/2012 | Jianu et al. | 717/174 |

(Continued)

OTHER PUBLICATIONS

Panagiotakis, et al., "Context Sensitive User Profiling for Customised Service Provision in Mobile Environments"; 2005 IEEE; [retrieved on May 1, 2014]; Retrieved from Internet <URL:http://ieeexplore.ieee.org/stamp/stamp.jsp?tp=&arnumber=1651793>;pp. 2014-2018.*

(Continued)

*Primary Examiner* — Xi D Chen
(74) *Attorney, Agent, or Firm* — Park, Vaughan, Fleming & Dowler LLP; Steven E. Stupp (57) ABSTRACT

A technique for facilitating customization of a software application is described. During this customization technique, an indicator, which indicates that a software application for an electronic device has been discovered by a user, is provided to a publisher of the software application. In response to the indicator, the publisher provides a token to the user. This token identifies a customized application-delivery service for the software application and/or a user-specific customization of the software application. Note that the customized application-delivery service and the user-specific customization are based on information about the user associated with the user's pre-existing or just-established relationship with the publisher. Next, the token is provided to an application-delivery service, and the application-delivery service provides the customized software application to the electronic device or a computer, for example, using the customized application-delivery service.

23 Claims, 6 Drawing Sheets

(56) References Cited

U.S. PATENT DOCUMENTS

| | | | |
|---|---|---|---|
| 8,346,223 B1* | 1/2013 | Byrnes et al. | 455/414.1 |
| 8,352,935 B2* | 1/2013 | Isaacson | 709/204 |
| 8,392,908 B2* | 3/2013 | Laicher et al. | 717/168 |
| 8,407,683 B2* | 3/2013 | Cheng et al. | 717/168 |
| 8,533,703 B2* | 9/2013 | Cheng et al. | 717/172 |
| 2003/0061206 A1* | 3/2003 | Qian | 707/3 |
| 2005/0273779 A1* | 12/2005 | Cheng et al. | 717/174 |
| 2007/0061486 A1 | 3/2007 | Trinh et al. | |
| 2007/0130156 A1 | 6/2007 | Tenhunen et al. | |
| 2007/0226150 A1* | 9/2007 | Pietrzak et al. | 705/59 |
| 2007/0234328 A1* | 10/2007 | Wilson et al. | 717/162 |
| 2008/0040714 A1* | 2/2008 | Wheeler et al. | 717/174 |
| 2008/0320079 A1 | 12/2008 | Da Palma et al. | |
| 2009/0094596 A1* | 4/2009 | Kuiper et al. | 717/174 |
| 2009/0157512 A1* | 6/2009 | King | 705/14 |
| 2009/0241104 A1* | 9/2009 | Amiga et al. | 717/174 |
| 2009/0254912 A1 | 10/2009 | Roundtree et al. | |
| 2009/0327138 A1* | 12/2009 | Mardani et al. | 705/64 |
| 2010/0017798 A1* | 1/2010 | Burkhardt et al. | 717/174 |

OTHER PUBLICATIONS

Caokim, Sedillot, "Profiles Management for Peronalised Services Provisioning"; 2002 IEEE; [retrieved on May 1, 2014]; Retrieved from Internet <URL:http://ieeexplore.ieee.org/stamp/stamp.jsp?tp=&arnumber=1002120>;pp. 315-322.*

Houssos, et al., "Specification and Dynamic Introduction of 3$^{rd}$ Party, Service-Specific Adaptatin Policies for Mobile Applications"; 2005 Springer Science; [retrieved on May 1, 2014]; Retrieved from Internet <URL:http://dl.acm.org/citation.cfm?id=1160162>;pp. 405-421.*

Korpipaa, et al., "Context Management for End user Development of Context-Aware Applications"; 2005 ACM; [retrieved on May 1, 2014]; Retrieved from Internet <URL:http://dl.acm.org/citation.cfm?id=1071246>;pp. 304-308.*

* cited by examiner

CUSTOMIZATION OF MOBILE-APPLICATION DELIVERY

BACKGROUND

The present disclosure relates to a software customization technique that facilitates a customized application-delivery service for a software application and/or a user-specific customization of the software application.

Currently, mobile software-application publishers or developers typically deliver software applications to portable electronic devices (such as cellular telephones) via software-application stores. These software-application stores usually provide a wide range of services, including: user management, billing and subscriptions, application upgrades, advertising, etc. In addition, the software-application stores allow users of portable electronic devices to discover or identify software applications that are of interest, and then deliver these software applications to the users via their portable electronic devices.

In particular, these operations are a portion of an overall user-fulfillment process that begins with the software-application developers 'publishing' their software applications to the software-application stores. While the publication process can be specific to particular software-application stores, in general it involves the software-application developers providing one or more delivery packages to the software-application stores, as well as possibly some additional information that describes the content(s) of the delivery packages.

Next, during a subsequent discovery process, a user may browse or search through a software-application catalog to locate or identify a desired software application. In order to initiate or request delivery of the desired software application, the user usually provides information that identifies the software application to a delivery service, which is associated with the software-application store. For example, the user may provide a delivery token that represents the request to the delivery service. (Usually, the delivery token is provided to the user when they select one of the catalog items during the discovery process.)

Delivery tokens are typically implemented using universal resource identifiers (URIs). In particular, a delivery request may be implemented using an HTTP get command with a delivery URI identifying a requested resource (i.e., the software application).

However, this software-application delivery process is often inflexible or, at best, has limited flexibility. For example, as a delivery request token, either a URI typically cannot distinguish among different users or, if it includes user-specific information, is restricted to the information about the user that is known or available to a software-application store. Thus, a URI usually only addresses or specifies the software application that is to be delivered and/or a narrow subset of user-specific information. Consequently, the existing software-application publishing process for portable electronic devices typically cannot accommodate generalized controlled customization of the software application and/or the delivery process for a given user or group of users, such as controlled customization based on user-specific information that is available to parties other than the software-application store.

Instead, this problem of generalized customization is currently partially addressed by the users via a manual, post-delivery process. However, this process can be difficult for many users, which is a source of frustration that can reduce customer satisfaction and sales of software applications.

Alternatively, the software-application developers can create and publish multiple delivery packages along with corresponding metadata that allows users to discover the appropriate delivery package (i.e., a version of the software application) during the discovery process. However, this approach does not support may types of customization. In addition, it may introduce numerous additional problems, including: the cost of creating, testing, packaging, publishing and managing multiple versions of a software application. These additional problems can also reduce customer satisfaction because it can be challenging for users to find the appropriate version of the software application among the potentially large number of published versions, and because the additional complexity in the user-fulfillment process can provide numerous opportunities for errors.

SUMMARY

The disclosed embodiments relate to an electronic device that facilitates customization of a software application at the time of delivery or during the software-application delivery process. During operation, the electronic device provides an indicator to a software publisher indicating that the software application for the electronic device (or another electronic device) has been discovered by a user, where the software application is associated with the software publisher, and where the electronic device and the other electronic device are associated with the user. In response to the indicator, the electronic device receives a token from the software publisher. Note that the token identifies a customized application-delivery service for the software application and/or a user-specific customization of the software application. Moreover, the customized application-delivery service and the user-specific customization are based on information about the user associated with the user's pre-existing or just-established relationship with the software publisher. Next, the electronic device provides the token to an application-delivery service. Then, the electronic device receives the customized software application from the application-delivery service, where receiving the customized software application can involve the customized application-delivery service.

Note that the indicator may indicate that the user is aware of the existence of the software application and/or that the user is interested in obtaining the software application. Moreover, the indicator may be provided to a location associated with the software publisher, such as a web page or website.

Furthermore, the electronic device may be a portable electronic device and/or a computer. If the electronic device is a computer (such as a desktop computer), the other electronic device may be the portable electronic device. Alternatively, the electronic device may be a portable electronic device.

In some embodiments, the electronic device receives the token after the user provides the indicator via the electronic device. For example, the token may be received by the user using at least one of email and a text message.

Additionally, providing the token to the application-delivery service may occur in a domain of a software-application store and/or a domain of the software publisher. Note that providing the token to the application-delivery service may involve navigating to a location associated with the customized application-delivery service. This location may be specific to at least the user. For example, the location may be dynamically generated for the user.

Furthermore, the user-specific customization of the software application may include at least one of: a language, user credentials, a service endpoint associated with the software application, and a user-specific security key.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an electronic device, a technique for facilitating customization of a software application, and a computer-program product (e.g., software) for use with the electronic device or a computer are described. During this customization technique, an indicator, which indicates that a software application for an electronic device has been discovered by a user, is provided to a software publisher of the software application. In response to the indicator, the software publisher provides a token to the user. This token identifies a customized application-delivery service for the software application and/or a user-specific customization of the software application. Note that the customized application-delivery service and the user-specific customization are based on information about the user associated with the user's pre-existing or just-established relationship with the software publisher. Then, the token is provided to an application-delivery service, and the application-delivery service provides the customized software application to the electronic device or the computer, for example, using the customized application-delivery service.

By facilitating the customized application-delivery service for the software application and/or the user-specific customization of the software application, this customization technique can eliminate the need for users to attempt to customize the software application via a manual, post-delivery process. Furthermore, a software publisher of the software application may not need to publish multiple delivery packages or versions of the software application. In addition to simplifying the user-fulfillment process and reducing the cost and complexity of publishing the software application, the customization technique can improve customer satisfaction and retention, as well as sales of the software application, thereby improving the revenue and market share of the software publisher.

In the discussion that follows, the customer may include one of a variety of entities, such as: an individual (for example, an existing customer of the software publisher or a software-application store, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
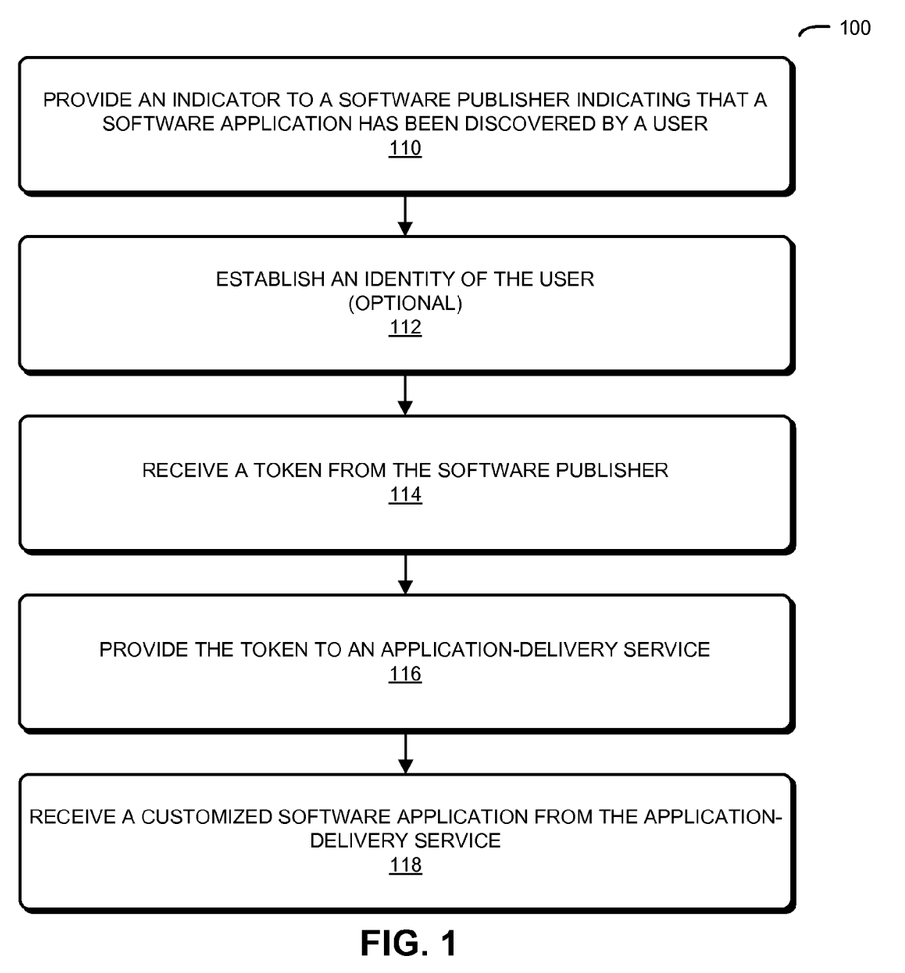
FIG. 1 is a flow chart illustrating a method for facilitating customization of a software application in accordance with an embodiment of the present disclosure.

We now describe embodiments of the customization technique. FIG. 1 presents a flow chart illustrating a method 100 for facilitating customization of a software application, which may be performed by an electronic device (such as electronic device 400 in FIG. 4). During operation, the electronic device provides an indicator to a software publisher indicating that the software application for the electronic device or another electronic device has been discovered by a user (operation 110), where the software application is associated with the software publisher (or a software developer), and where the electronic device and the other electronic device are associated with the user. Note that the indicator may indicate that the user is aware of the existence of the software application and/or that the user is interested in obtaining the software application. Moreover, the indicator may be provided to a location associated with the software publisher, such as a web page or website. For example, the indicator may be provided when the user 'discovers' the software application on the software publisher's website or web page.

Furthermore, the electronic device may be a portable electronic device and/or a computer. If the electronic device is a computer (such as a desktop computer), the other electronic device may be the portable electronic device (thus, the user-fulfillment process for the software application for the portable electronic device may occur via the computer). Alternatively, the electronic device may be a portable electronic device, i.e., method 100 may involve direct communication with the user's portable electronic device (as opposed to interaction with the user's computer).

In response to the indicator, the electronic device receives a token from the software publisher (operation 114). This token may identify a customized application-delivery service for the software application and/or a user-specific customization of the software application. Moreover, the customized application-delivery service and the user-specific customization may be based on information about the user associated with the user's pre-existing relationship with the software publisher (i.e., a relationship that predates the downloading of the software application, such as that with a financial service provider or a provider of financial software applications). (Alternatively, the information may be associated with a relationship that is just established with the software published, i.e., the information may not predate the user interest in downloading the software application.) For example, the user-specific customization of the software application may include: a language, user credentials, a service endpoint associated with the software application, and/or a user-specific security key. Note that the information may be available to the software publisher but may or may not be available or known to the software-application store. Furthermore, note that, in some embodiments, prior to receiving the token (operation 114), an identity of the user is optionally established (operation 112), and this identity is represented in the token, thereby enabling customization.

In some embodiments, the electronic device receives the token after the user provides the indicator via the electronic device. For example, the token may be received by the user using at least one of email and a text message.

Then, the electronic device provides the token to an application-delivery service (operation 116). For example, providing the token to the application-delivery service may occur in a domain of a software-application store and/or a domain of the software publisher. Note that providing the token to the application-delivery service may involve navigating to a location associated with the customized application-delivery service. For example, the user may be redirected to a pre-existing uniform resource locator (URL) in the domain of the software-application store. Alternatively, the location may be specific to at least the user, such as a location (for example, a URL) that is dynamically generated for the user. In either case, the user may be provided an email or a text message that includes information (such as the URL) that tells the application-delivery service how to customize the application-delivery service and/or how to provide a user-specific customization of the software application.

Next, the electronic device receives the customized software application from the application-delivery service (operation 118), where receiving the customized software application can involve the customized application-delivery service.

Figure 2:
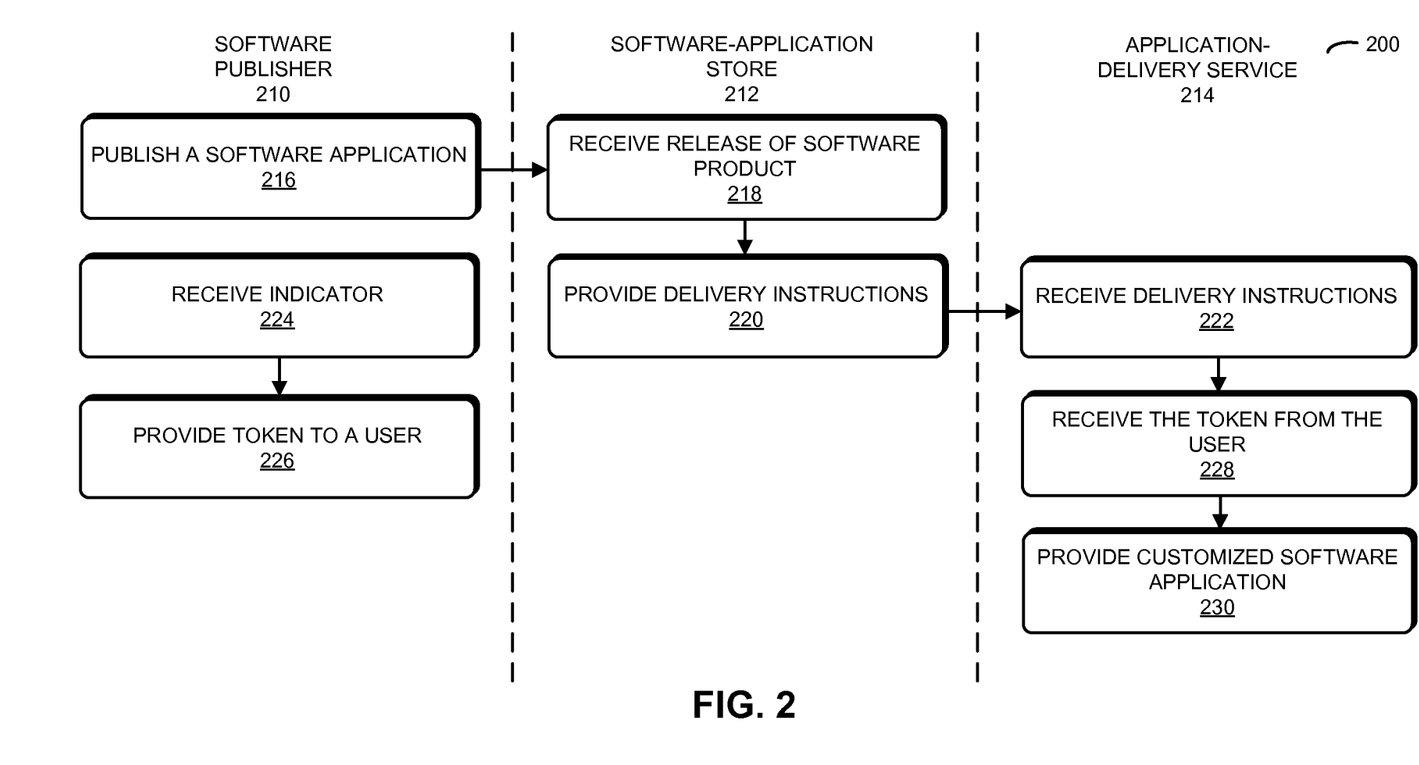
FIG. 2 is a flow chart illustrating the method of FIG. 1 that is performed by a system in accordance with an embodiment of the present disclosure.
Figure 3:
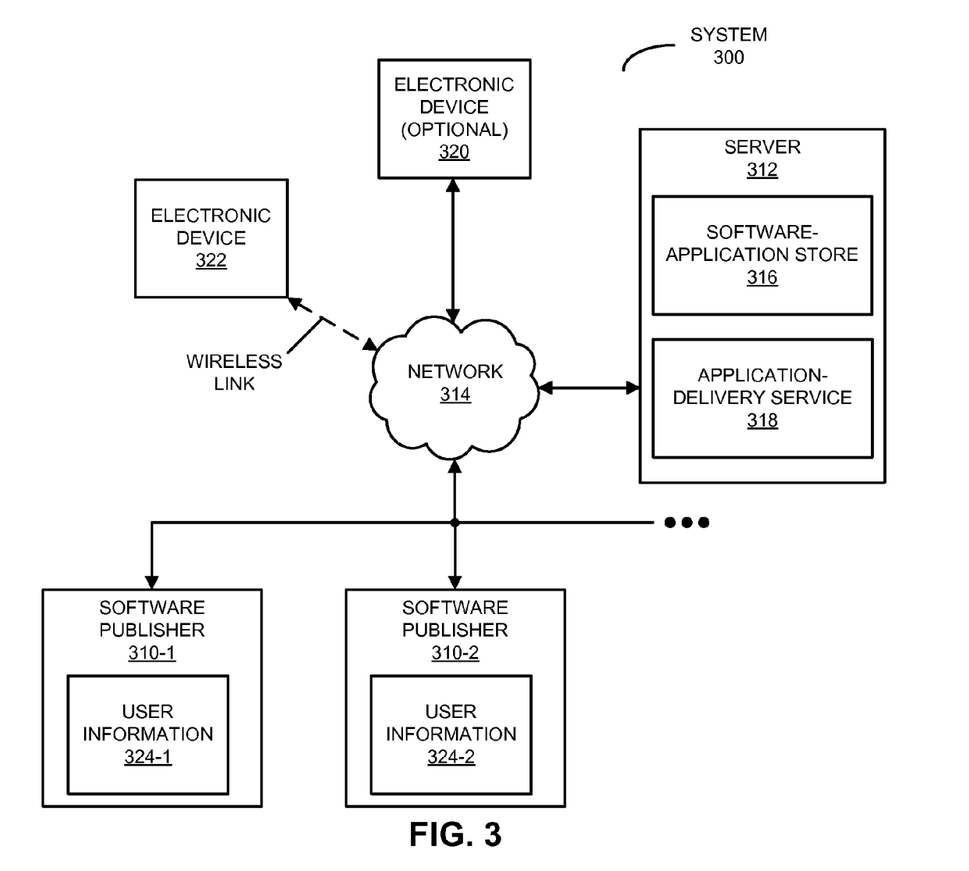
FIG. 3 is a block diagram illustrating a system that performs the method of FIG. 1 or 2 in accordance with an embodiment of the present disclosure.

The interaction among the software publisher, the software-application store and the application-delivery service is further illustrated in FIG. 2, which presents a flow chart illustrating method 100 (FIG. 1). This method may be performed by system 300 (FIG. 3).

During this method, a software publisher 210 publishes a software application to software-application store 212 (operation 216), which receives it (operation 218). Moreover, delivery instructions associated with the software application are provided by software-application store 212 (operation 220) to application-delivery service 214, which subsequently receives them (operation 222).

Then, while the user is browsing or searching through the software applications at a location associated with software publisher 210 or software-application store 212 (such as a web page or website) using the electronic device, the user may discover or identify the software application. When this occurs, the user may activate an icon that is displayed on the electronic device, thereby providing an indicator to software publisher 210 that the software application has been discovered by the user, i.e., that the user is aware of the existence of the software application and/or that the user is interested in obtaining the software application. This indicator may be received by software publisher 210 (operation 224).

In response to the indicator, software publisher 210 may provide a token to the user (operation 226), for example, via the electronic device. As noted previously, this token may identify a customized application-delivery service for the software application and/or a user-specific customization of the software application, for example, based on information about the user associated with the user's pre-existing or just-established relationship with software publisher 210.

Then, the electronic device provides the token to application-delivery service 214, which receives it (operation 228). In general, the token may be provided to application-delivery service 214 in a domain of software-application store 212 and/or a domain of software publisher 210.

Next, application-delivery service 214 provides the customized software application (operation 230) based on the token and the delivery instructions (which were previously received from software-application store 212), which is subsequently received by the electronic device. Note that receiving the customized software application can involve the customized application-delivery service.

In some embodiments of methods 100 (FIGS. 1 and 2), there may be additional or fewer operations. Moreover, the order of the operations may be changed, and/or two or more operations may be combined into a single operation.

In an exemplary embodiment, instead of having multiple delivery packages (e.g., versions of the software application) and associated metadata, the customization technique associates a delivery token for a given user with delivery instructions that can be customized by the software publisher, thereby facilitating controlled customization at the time of delivery of the software application for use on a portable electronic device. Note that there can be multiple sets of delivery instructions per delivery package or software application (which may be published by the software publisher and stored by the software-application store). Furthermore, this customization can be for a single user or a group of users. This customization technique may enable a customized application-delivery service for the software application and/or a user-specific customization of the software application that, currently, are difficult if not impossible to support.

Thus, rather than provisioning or providing users of portable electronic devices with tokens that point to delivery packages, software publishers can supply these users with tokens that point to delivery instructions. When a given user submits a delivery request, the application-delivery service uses the token to locate the specific set of delivery instructions and customizes the delivery package and/or the delivery process based on the delivery instructions.

Note that the delivery instructions may be implemented as key-value pairs that are packaged and delivered along with the software application when it is published by a software publisher. Alternatively or additionally, the delivery instructions may include executable programs that generate or adapt delivery packages in response to user-delivery requests.

Furthermore, note that the customization may include: supplying the delivered software application with a user name or key, which is known to a back-end service; delivering a version of the software application in a specific language; and/or configuring the service endpoints used by the software application. For example, many software applications for use on portable electronic devices are thin clients for back-end services, i.e., the software application is not a stand-alone application. Instead, it has a server-side component (which forms the basis of the service provided to the user). In order to use such a software application, a user may need to have previously established a relationship with the back-end service. However, if, at the time of delivery, the delivery process or the delivery package can be customized based on information about the user (which is known to the back-end service), this requirement may be eliminated, and the user experience may be significantly improved.

Alternatively, a software application may need to access different service endpoints based on known factors associated with a user, such as: a user's cellular provider, the user's geographic region, the user's preferred language, etc. Using the customization technique, these factors may be included in the delivered software application.

In another example, in order to authenticate to the back-end service, the user may need to provide or enter credentials. If the credentials accepted by the back-end service are weak, they may be broken by an attacker. However, entering strong credentials on a portable electronic device can be difficult. Using the customization technique, the software application may be configured with a user-specific key when the software application is delivered. This key may be used in conjunction with (relatively) weak credentials to protect service authentication from attacks, such as so-called 'dictionary' attacks.

Thus, in general, the customization technique may facilitate customization of the software application at the time of delivery.

In an exemplary embodiment, John is a customer of an online banking service, which is provided by BankAnywhere, Inc. Note that this online banking service may be branded in accordance with the customer's financial institution. While using the online banking website, John discovers that there is a software application that he could use to access some of the banking functionality using his cellular telephone. Consequently, John requests access to this software application.

In response to John's request, BankAnywhere calls an application programming interface (API) of an application-delivery service associated with a software-application store to create an instance of delivery instructions using the pre-existing information in John's profile. Note that this API call may be via a secure communication channel. In this way, John's private information can remain completely opaque to the application-delivery service.

Furthermore, in the delivery instructions BankAnywhere may specify branding resources specific to John's bank, which are known to BankAnywhere. In this way, the delivery package may include appropriate branding resources, which are different for different banks. Additionally, the delivery instructions may also include a unique key that is generated specifically for John's instance of the software application. For example, this unique key may be used to protect information exchanged between John and the service provided by BankAnywhere.

Alternatively or additionally, the delivery instructions may specify U.S. English as John's preferred language and may define or set his geographic region as California. Once again, this customization may occur in a way that remains private to John and BankAnywhere.

Then, the software-application store returns a token to BankAnywhere that identifies the delivery instructions created for John. In response, BankAnywhere sends John a text message with the token in the form of a URL. (In general, the token may also be sent by email or delivered using a platform-specific mechanism.) If necessary, access to or use of the token can be protected by passwords or other security mechanisms, either on the electronic device, on the other electronic device or by the application-delivery service.

When John opens the text message, a text-messaging application on the electronic device recognizes the URL and provides an option to open the Web browser with this URL. This results in a HyperText Transfer Protocol request of the resource identified by the URL. Note that the resource may be in the domain of the application-delivery service, and may identify the delivery instructions created for John by BankAnywhere.

Using the delivery instructions, the application-delivery service may customize the BankAnywhere software-application package and may deliver it to John's electronic device (for example, his computer or his portable electronic device). If the software application is delivered directly to John's portable electronic device, the package media type may be recognized on the portable electronic device and a mobile application manager may be invoked to process the package content.

Once the software application is successfully installed, the mobile application manager may notify the application-delivery service. Moreover, the installation status may be subsequently provided to the service offered by BankAnywhere via an API provided by the application-delivery service to software publishers.

We now describe embodiments of a system and its use. FIG. 3 presents a block diagram illustrating system 300 that performs methods 100 (FIGS. 1 and 2). In this system, software publishers 310 publish software applications to software-application store 316 (which is hosted on server 312) via network 314. Subsequently, a user of optional electronic device 320 (such as a computer) may discover one of these software applications on software-application store 316. For example, the user may access a catalog of software applications offered by software-application store 316 using a Web browser (which is installed and executes in the environment of optional electronic device 320) to access a web page or website associated with software-application store 316 via network 314. This software application may be intended for use on electronic device 322 (such as a portable electronic device).

Alternatively, the user may discover the software application on software-application store 316 using electronic device 322 directly (i.e., without using optional electronic device 320). For example, the Web browser may be installed and may execute in the environment of electronic device 322.

When the user provides the indicator to the associated software publisher (such as software publisher 310-1), for example, by activating an icon in a user interface on optional electronic device 320 or electronic device 322, software publisher 310-1 may provide a token to the user. In particular, the token may be provided to optional electronic device 320 or electronic device 322 via network 314. Note that this token, which may identify a customized application-delivery service for the software application and/or a user-specific customization of the software application, may be based on user information 324-1 that is based on the user's pre-existing or just-established relationship with software publisher 310-1.

Then, optional electronic device 320 or electronic device 322 may provide the token to application-delivery service 318, which may be hosted on server 312. (As noted previously, in general the token may be provided to application-delivery service 318 in a domain of software-application store 316 and/or a domain of software publisher 310-1. In the latter case, software publisher 310-1 may subsequently provide the token to application-delivery service 318).

Next, application-delivery service 318 may provide the customized software application to optional electronic device 320 or electronic device 322 via network 314. Note that, if the optional electronic device 320 receives the customized software application, then optional electronic device 320 may subsequently provide the customized software application to electronic device 322.

Additionally, note that the indicator, the token, the software application, and/or user information 324 may be stored at one or more locations in system 300 (i.e., locally or remotely). Moreover, because this data may be sensitive in nature, it may be encrypted. For example, stored data and/or data communicated via network 314 may be encrypted.

Figure 4:
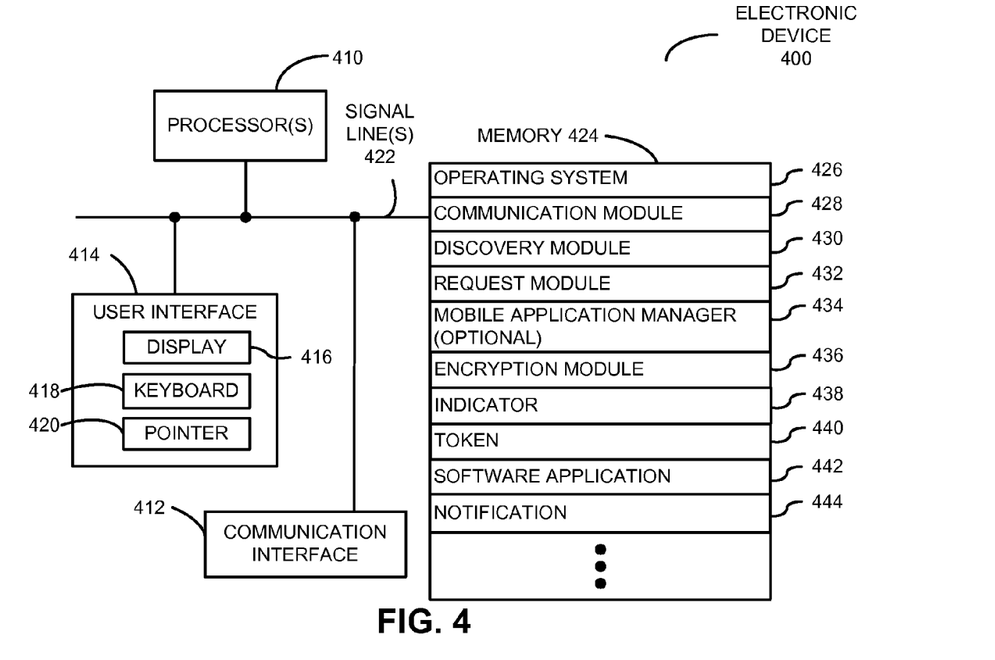
FIG. 4 is a block diagram illustrating an electronic device that performs the method of FIG. 1 or 2 in accordance with an embodiment of the present disclosure.

FIG. 4 presents a block diagram illustrating an electronic device 400 that performs method 100 (FIGS. 1 and 2), such as optional electronic device 320 (FIG. 3) or electronic device 322 (FIG. 3). Electronic device 400 includes one or more processors 410, a communication interface 412, a user interface 414, and one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in electronic device 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more electronic devices, computers, computer systems and/or servers, including electronic devices, computers, computer systems and/or servers that are remotely located with respect to electronic device 400.

Memory 424 may also include multiple program modules (or sets of instructions), including: discovery module 430 (or a set of instructions), request module 432 (or a set of instructions), optional mobile application manager 434 (or a set of instructions), and/or encryption module 436 (or a set of instructions). Note that one or more of these program modules (or sets of instructions) may constitute a computer-program mechanism.

During operation of electronic device 400, a user may discover a software application on a software-application store using discovery module 430, and may provide an indicator 438 to the associated software publisher.

Figure 5:
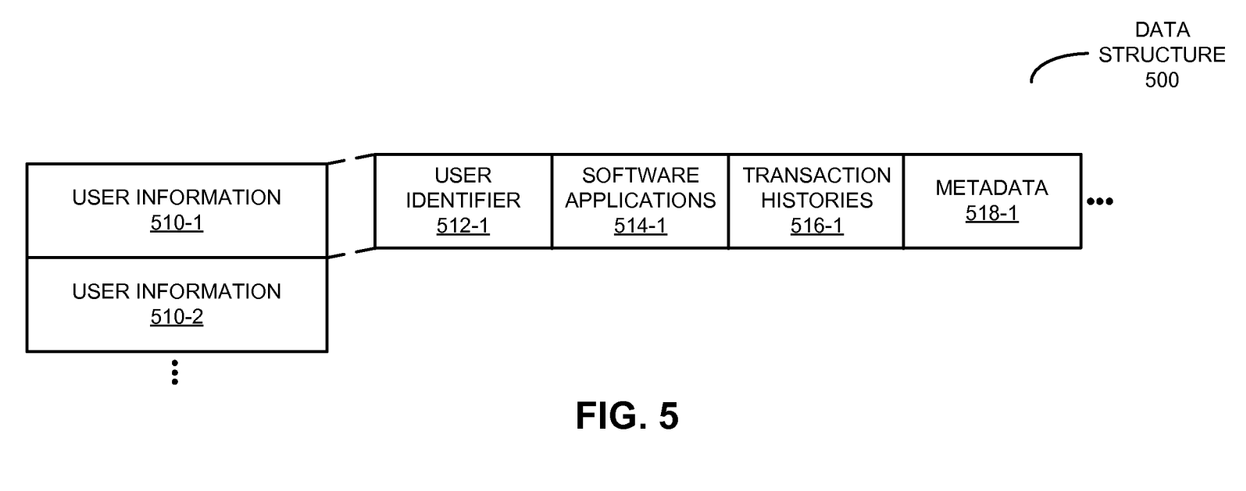
FIG. 5 is a block diagram illustrating a data structure in accordance with an embodiment of the present disclosure.

Then, discovery module 430 may receive token 440 from the software publisher, which may identify a customized application-delivery service for the software application and/or a user-specific customization of the software application. As noted previously, token 440 may be selected or generated by the software publisher based on information about the user associated with the user's pre-existing or just-established relationship with the software publisher. This information may be contained in a data structure, such as data structure 500, which is illustrated in FIG. 5. In particular, data structure 500 may include user information 510. For example, user information 510-1 for a given user may include: a user identifier 512-1, one or more software applications 514-1 used by user 510-1, one or more transaction histories 516-1 associated with software applications 514-1, metadata 518-1, etc. For example, the software publisher may provide financial services to user 510-1, and the one or more software application 514-1 may include one or more financial software applications, such as: Quicken™ and/or TurboTax™ (from Intuit, Inc., of Mountain View, Calif.), Microsoft Money™ (from Microsoft Corporation, of Redmond, Wash.), Splash-Money™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the one or more financial-software applications may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

Referring back to FIG. 4, request module 432 may provide token 440 to an application-delivery service (either directly or via the software publisher), which is associated with the software-application store. In response, the application-delivery service may provide software application 442 to electronic device 400. As noted previously, software application 442 may be customized to the user and/or may be provided via a customized application-delivery service based on the information in or associated with token 440.

In embodiments where electronic device 400 is the user's computer, software application 442 is then provided to the user's portable electronic device for installation. Alternatively, in embodiments where electronic device 400 is the user's portable electronic device, optional mobile application manager 434 may install software application 442 and may provide notification 444 to the application-delivery service.

Because indicator 438, token 440, software application 442 and/or notification 444 may be sensitive in nature, in some embodiments at least some of the data stored in memory 424 and/or at least some of the data communicated using communication module 428 is encrypted using encryption module 436.

Figure 6:
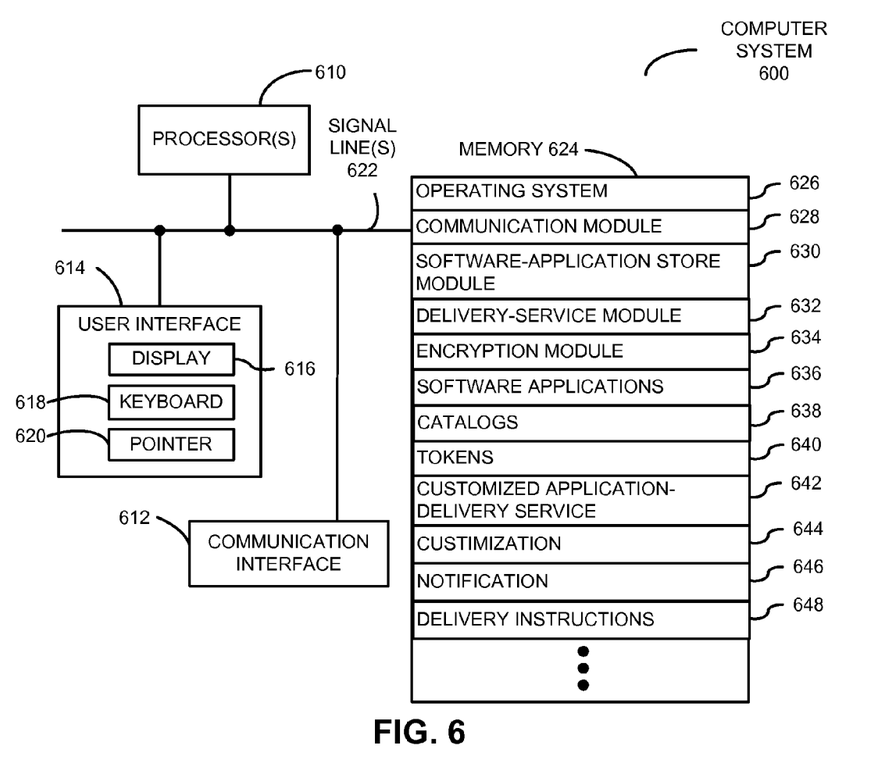
FIG. 6 is a block diagram illustrating a computer system in the system of FIG. 4 in accordance with an embodiment of the present disclosure.

FIG. 6 presents a block diagram illustrating a computer system 600, such as server 312 (FIG. 3). Computer system 600 includes one or more processors 610, a communication interface 612, a user interface 614, and one or more signal lines 622 coupling these components together. Note that the one or more processors 610 may support parallel processing and/or multi-threaded operation, the communication interface 612 may have a persistent communication connection, and the one or more signal lines 622 may constitute a communication bus. Moreover, the user interface 614 may include: a display 616, a keyboard 618, and/or a pointer 620, such as a mouse.

Memory 624 in computer system 600 may include volatile memory and/or non-volatile memory. More specifically, memory 624 may include: ROM, RAM, EPROM, EEPROM, flash memory, one or more smart cards, one or more magnetic disc storage devices, and/or one or more optical storage devices. Memory 624 may store an operating system 626 that includes procedures (or a set of instructions) for handling various basic system services for performing hardware-dependent tasks. Memory 624 may also store procedures (or a set of instructions) in a communication module 628. These communication procedures may be used for communicating with one or more computers, computer systems and/or servers, including computers, computer systems and/or servers that are remotely located with respect to computer system 600.

Memory 624 may also include multiple program modules (or sets of instructions), including: software-application store module 630 (or a set of instructions), delivery-service module 632 (or a set of instructions), and/or encryption module 634 (or a set of instructions). Note that one or more of these program modules (or sets of instructions) may constitute a computer-program mechanism.

During operation of computer system 600, software applications 636 that are offered to users by software-application store module 630 may be received from software publishers. These software applications may be arranged in one or more catalogs 638.

When a user (or the user's electronic device) provides one of tokens 640 (either directly to software-application store module 630 or indirectly via the associated software publisher), delivery-service module 632 uses the information in or associated with this token (such as delivery instructions 648) to provide an optional customized application-delivery service 642 for the software application and/or a user-specific customization of software application 644 to an electronic device associated with the user. Subsequently, after the software application has been installed on the user's portable electronic device, a notification 646 may be received from the portable electronic device by delivery-service module 632.

Because token 640, software applications 636, notification 646 and/or delivery instructions 648 may be sensitive in nature, in some embodiments at least some of the data stored in memory 624 and/or at least some of the data communicated using communication module 628 is encrypted using encryption module 634.

Instructions in the various modules in memory 424 (FIG. 4) and/or memory 624 may be implemented in: a high-level procedural language, an object-oriented programming language, and/or in an assembly or machine language. Note that the programming language may be compiled or interpreted, e.g., configurable or configured, to be executed by the one or more processors 410 (FIG. 4) and/or 610.

Although electronic device 400 (FIG. 4) and computer system 600 are illustrated as having a number of discrete items, FIGS. 4 and 6 are intended to be functional descriptions of the various features that may be present in electronic device 400 and computer system 600 rather than a structural schematic of the embodiments described herein. In practice, and as recognized by those of ordinary skill in the art, the functions of computer system 600 may be distributed over a large number of servers or computers, with various groups of the servers or computers performing particular subsets of the functions. In some embodiments, some or all of the functionality of electronic device 400 (FIG. 4) and/or computer system 600 may be implemented in one or more application-specific integrated circuits (ASICs) and/or one or more digital signal processors (DSPs).

In the preceding discussion, a computer may refer to a personal or client computer, and a computer system may refer to a server. However, in other embodiments, 'computer' and 'computer system' may be used interchangeably. More generally, a 'computer' and a 'computer system' in the preceding discussion may include one of a variety of devices capable of manipulating computer-readable data or communicating such data between two or more electronic devices over a network, including: a personal computer, a laptop computer, a mainframe computer, a portable electronic device (such as a cellular phone or PDA), a server and/or a client computer (in a client-server architecture). Moreover, network 314 (FIG. 3) may include: the Internet, World Wide Web (WWW), an intranet, LAN, WAN, MAN, or a combination of networks, or other technology enabling communication between computing systems.

System 300 (FIG. 3), electronic device 400 (FIG. 4), data structure 500 (FIG. 5) and/or computer system 600 may include fewer components or additional components. Moreover, two or more components may be combined into a single component, and/or a position of one or more components may be changed. In some embodiments, the functionality of electronic device 400 (FIG. 4) and/or computer system 600 may be implemented more in hardware and less in software, or less in hardware and more in software, as is known in the art.

While the preceding discussion illustrated the customization technique with a single software publisher and a single software-application store, this customization technique may be offered as a paid service to multiple software publishers and/or retailers. Furthermore, while a software application is used as an illustrative example, in other embodiments this approach may be used to customize a wide variety of content and/or the delivery of this content, such as: music, movies, newspapers, books, articles, magazines, documents, medical information, etc.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic-device-implemented method for facilitating customization of a software application, comprising:
    discovering a software application, developed for an electronic device, based on a software publisher publishing the software application;
    providing an indicator to the software publisher about the discovering, wherein the software application is associated with the software publisher, and wherein the electronic device is associated with the user;
    receiving a token from the software publisher, wherein the token indicates a uniform resource locator (URL) for an instance of a user-specific customization of the software application, wherein the software publisher uses an application-delivery service associated with the software application to create an installable instance of user-specific customization of the software application using pre-existing information in the user's profile, wherein the token identifies a customized application-delivery service for the software application and a user-specific customization of the software application, and wherein the customized application-delivery service and the user-specific customization are based on information about the user associated with the user's pre-existing relationship with the software publisher;
    providing the token to an application-delivery service, wherein the token is provided to the application-delivery service when the user activates the URL;
    receiving the customized software application from the application-delivery service at the electronic device, wherein receiving the customized software application can involve the customized application-delivery service; and
    installing the customized software application on the electronic device.

2. The method of claim 1, wherein the indicator is provided to a location associated with the software publisher.

3. The method of claim 1, wherein the token is received by the user using at least one of email and a text message.

4. The method of claim 1, wherein providing the token to the application-delivery service occurs in a domain of a software-application store.

5. The method of claim 1, wherein providing the token to the application-delivery service occurs in a domain of the software publisher.

6. The method of claim 1, wherein providing the token to the application-delivery service involves navigating to a location associated with the customized application-delivery service.

7. The method of claim 6, wherein the location is specific to at least the user.

8. The method of claim 6, wherein the location is dynamically generated for the user.

9. The method of claim 1, wherein the user-specific customization of the software application includes at least one of: a language, user credentials, a service endpoint associated with the software application, and a user-specific security key.

10. The method of claim 1, wherein the pre-existing information in the user's profile information is opaque to the application-delivery service.

11. The method of claim 9, wherein the user-specific security key is generated specifically for the user's instance of the software application.

12. A computer-program product for use in conjunction with an electronic device, the computer-program product comprising a non-transitory computer-readable storage medium and a computer-program mechanism embedded therein, to facilitate customization of a software application, the computer-program mechanism including:
    instructions for discovering a software application, developed for an electronic device, based on a software publisher publishing the software application;
    instructions for providing an indicator to the software publisher about the discovering, wherein the software application is associated with the software publisher, and wherein the electronic device is associated with the user;
    instructions for receiving a token from the software publisher, wherein the token indicates a uniform resource locator (URL) for an installable_instance of a user-specific customization of the software application, and wherein the installable instance of the user-specific customization of the software application is based on information about the user associated with the user's pre-existing relationship with the software publisher;
    instructions for creating the installable instance of the user-specific customization of the software application using the pre-existing information in the user's profile;
    instructions for providing the token to an application-delivery service, wherein the token is provided to the application-delivery service when the user activates the URL;
    instructions for receiving the installable instance of the user-specific customization of the software application from the application-delivery service at the electronic device; and
    instructions for installing the installable instance of the user-specific customization of the software application on the electronic device.

13. The computer-program product of claim 12, wherein the indicator is provided to a location associated with the software publisher.

14. The computer-program product of claim 12, wherein the token is received by the user using at least one of email and a text message.

15. The computer-program product of claim 12, wherein providing the token to the application-delivery service occurs in a domain of a software-application store.

16. The computer-program product of claim 12, wherein providing the token to the application-delivery service occurs in a domain of the software publisher.

17. The computer-program product of claim 12, wherein providing the token to the application-delivery service involves navigating to a location associated with the customized application-delivery service.

18. The computer-program product of claim 17, wherein the location is specific to at least the user.

19. The computer-program product of claim 17, wherein the location is dynamically generated for the user.

20. The computer-program product of claim 12, wherein the user-specific customization of the software application includes at least one of: a language, user credentials, a service endpoint associated with the software application, and a user-specific security key.

21. The computer program product of claim 12, wherein the pre-existing information in the user's profile information is opaque to the application-delivery service.

22. The computer program product of claim 12, wherein the user-specific security key is generated specifically for the user's instance of the software application.

23. An electronic device, comprising:
    a processor;
    memory; and
    a program module, wherein the program module is stored in the memory and configurable to be executed by the processor to facilitate customization of a software application, the program module including:
        instructions for discovering a software application, developed for an electronic device, based on a software publisher publishing the software application;
        instructions for providing an indicator to the software publisher about the discovering, wherein the software application is associated with the software publisher, and wherein the electronic device is associated with the user;
        instructions for receiving a token from the software publisher, wherein the token indicates a uniform resource locator (URL) for an instance of a user-specific customization of the software application, wherein the software publisher uses an application-delivery service associated with the software application to create an installable instance of user-specific customization of the software application using pre-existing information in the user's profile, wherein the token identifies a customized application-delivery service for the software application and a user-specific customization of the software application, and wherein the customized application-delivery service and the user-specific customization are based on information about the user associated with the user's pre-existing relationship with the software publisher;
        instructions for providing the token to an application-delivery service, wherein the token is provided to the application-delivery service when the user activates the URL;
        instructions for receiving the customized software application from the application-delivery service at the electronic device, wherein receiving the customized software application can involve the customized application-delivery service; and instructions for installing the customized software application on the electronic device.

* * * * *